United States Patent [19]
Osthues et al.

[11] Patent Number: 5,784,993
[45] Date of Patent: Jul. 28, 1998

[54] SYSTEM FOR CONTROLLING AND OPERATING A COW-MILKING CAROUSEL

[75] Inventors: Uwe Osthues, Menden; Ralf Wohlbrück, Oelde; Bernhard Schulze Wartenhorst, Warendorf, all of Germany

[73] Assignee: Westfalia Separator Aktiengesellschaft, Oelde, Germany

[21] Appl. No.: 591,544

[22] PCT Filed: Jul. 22, 1994

[86] PCT No.: PCT/EP94/02418

§ 371 Date: Jan. 25, 1996

§ 102(e) Date: Jan. 25, 1996

[87] PCT Pub. No.: WO95/07019

PCT Pub. Date: Mar. 16, 1995

[30] Foreign Application Priority Data

Sep. 11, 1993 [DE] Germany ............... 43 30 894.5

[51] Int. Cl.$^6$ ............... A01J 5/00
[52] U.S. Cl. ............... 119/14.04; 119/14.02
[58] Field of Search ............... 119/14.04, 14.08, 119/14.14, 51.02

[56] References Cited

U.S. PATENT DOCUMENTS

| | | | |
|---|---|---|---|
| 1,125,348 | 1/1915 | Lawrence | 119/14.14 |
| 3,460,515 | 8/1969 | Page et al. | 119/14.04 |
| 3,835,814 | 9/1974 | Jacabs et al. | 119/14.04 |

FOREIGN PATENT DOCUMENTS

| | | |
|---|---|---|
| 1576765 | 1/1969 | France . |
| 546327 | 2/1977 | Russian Federation . |
| 938844 | 7/1982 | Russian Federation . |
| 1113055 | 9/1984 | Russian Federation . |
| 1308664 | 2/1973 | United Kingdom . |

*Primary Examiner*—John G. Weiss
*Assistant Examiner*—David J. Cho
*Attorney, Agent, or Firm*—Sprung Kramer Schaefer & Briscoe

[57] ABSTRACT

A system for controlling and operating a cow-milking carousel which is rotatable at different speeds and has an entrance, an exit and a plurality of milking stations wherein teat cups are applied to an animal and are automatically removed when the animal has been milked. The system has at least two checkpoints along a direction of rotation for monitoring a position of the teat cups of milking stations passing thereby and for effecting an automatic adjustment of the speed of the carousel such that the number of teat cups which have not yet been removed at a first of the at least two checkpoint, but have been removed at a second of the at least tow checkpoints, is maximized.

12 Claims, 1 Drawing Sheet

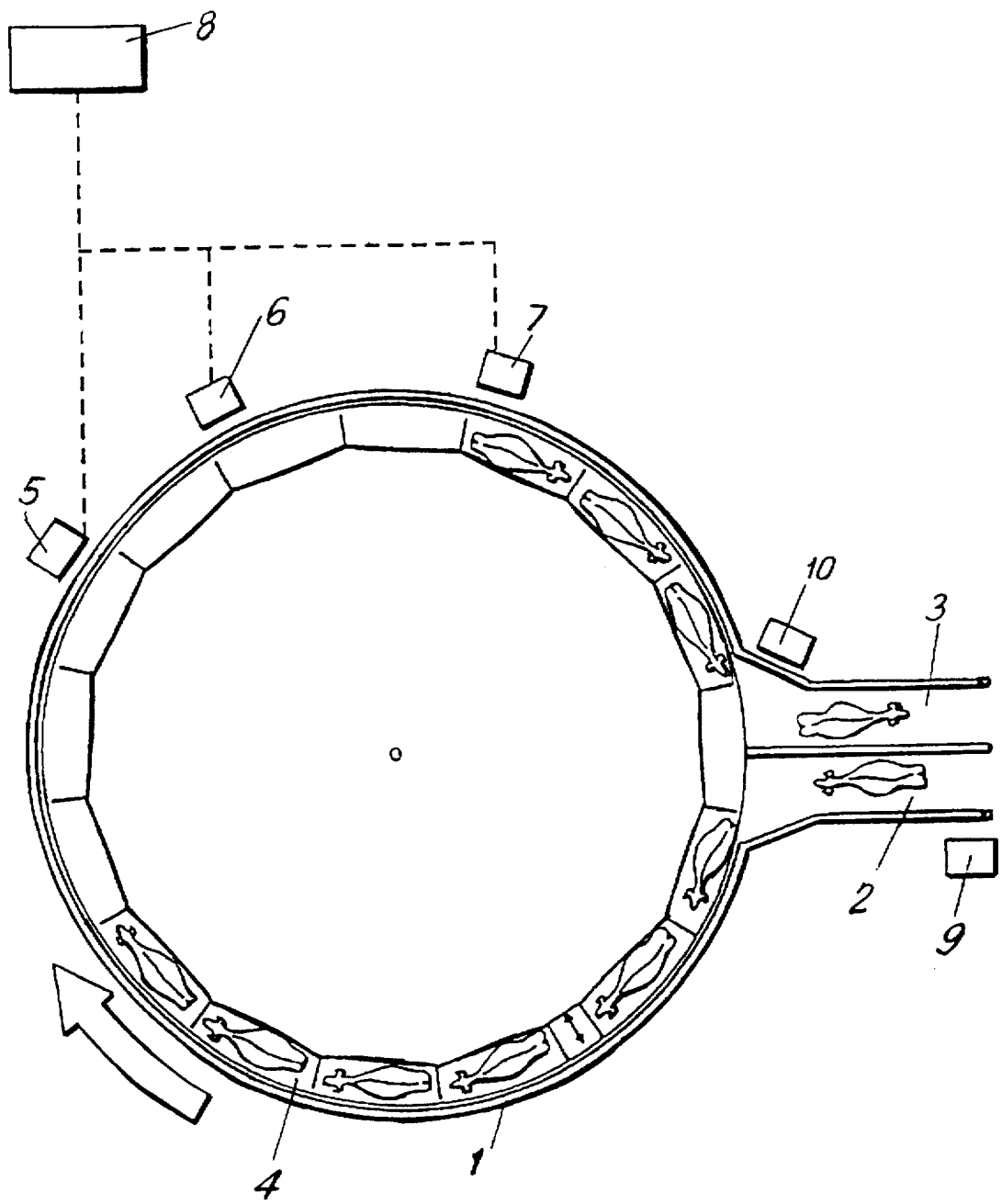

1

SYSTEM FOR CONTROLLING AND OPERATING A COW-MILKING CAROUSEL

This Application is a 371 Application of PCT/EP94/02418 filed Jul. 22, 1994.

BACKGROUND OF THE INVENTION

The present invention concerns a system for controlling and operating a cow-milking carousel that rotates at different speeds. The carousel has an animal-identity confirmation device at the entrance and an animal-monitoring device at the exit. It also has a number of milking stands. Teat cups are applied to the animals at the milking stands and are automatically removed once the animals have been milked.

Similar cow-milking carousels are known from the present applicant's publication 9997-9287-020/0393 entitled Melkanlagen. They are intended to increase the productivity of large herds of dairy cows. Hourly rates of more than 100 animals per operator can generally be attained. This is possible, however, only when the milking capacity of the herd has been highly standardized. When the herd contains even just a few slow-to-milk cows, the carousel must be decelerated to ensure that they too can be milked dry in one rotation of the device. This factor decreases average output per hour.

Although the speeds of known cow-milking carousels are variable, a single speed that experience has demonstrated optimal is generally employed in practice. Since the operators must work inside the carousel for two to seven hours at a time, readiness to manually vary the speed decreases with milking time. The teat cups are applied manually and removed by an automatic device when milk flow lessens. To prevent animals from leaving the carousel before the teat cups have been removed, it can be provided with a brake that stops it when an animal with cups still in place arrives just in front of the exit. The carousel is started manually again once the animal has been milked dry.

Austrian Patent 271 078 describes a cow-milking carousel that rotates at speeds controlled by sensors in the vicinity of the entrance and exit. The carousel is decelerated when animals do not leave these areas within a prescribed time. This feature is intended to protect the animals. The same publication suggests another sensor to monitor the operator and vary the speed when he leaves his post. These approaches, however, do not deal with the problem of adjusting the speed of the carousel to account for the cows that are slowest to milk.

SUMMARY OF THE INVENTION

The object of the present invention is a cow-milking carousel that will automatically adjust its speed to take the slowest-to-milk cows into account.

This object is attained in accordance with the present invention in that the position of the teat cups is monitored at two checkpoints along the direction of rotation, and operating-and-control devices adjust the speed of the carousel until the teat cups have to the greatest extent possible not yet been removed at the first checkpoint but have been removed to the greatest extent possible at the second checkpoint.

How the carousel's speed can be adjusted will now be described. A time $T_1$ is determined at the first checkpoint and a time $T_2$ at the second checkpoint, between which the last two not yet finished milking stands have been passed. Since during the passage from the first to the second checkpoint the teat cups will have been removed at some milking stands, $T_1$ will be smaller than $T_2$. The carousel can be accelerated to obtain a specific threshold time $T_{GR}$ at which the control times will coincide with what are called the milking-point reloading times. During one period $T_{MK}$ of a carousel with $Z_{MP}$ milking stands accordingly, $$T_{GR}=T_{MK}/Z_{MP}.$$

The carousel's animal-milking potential can be fully exploited by the procedure that will now be described. When milking is initiated and the first animal enters the carousel, the machinery is maximally accelerated. Both $T_{MK}$ and $T_{GR}$ will be minimal. Once $T_{GR}=T_1=T_2$, the parametrizable increment of the carousel speed will be adjusted until $T_{GR} \leq T_1 < T_2$.

To ensure fluent milking, the distance between the checkpoints can be varied such that the carousel will not need to be stopped for "normally productive" animals at maximal speed.

One advantageous embodiment of the present invention features additional checkpoints downstream of the second checkpoint in the direction of rotation. The times $T_1$, $T_2$, and $T_3$ elapsed between passing each last two not-yet-removed milking stands are measured at each checkpoint. The carousel's speed is varied by parametrizable increments until $T_{GR} \leq T_1 < T_2 < T_3$ or until that situation is approached.

The checkpoints can be provided with pulse generators activated by the teat cups. The pulse generators can be light barriers.

The checkpoints in one practical embodiment are connected to pulse generators that initiate automatic removal of the teat cups. Special pulse generators that sense the presence of teat cups against the udder are not necessary, milking stand, with respect to each animal. The position of the second checkpoint is established strictly electronically in the device, and the pulse itself is a signal obtained from the automatic teat-cup remover.

One embodiment of the present invention will now be described with reference to the accompanying drawing, wherein.

BRIEF DESCRIPTION OF THE DRAWING

The FIGURE is a top view of the system according to the invention.

DETAILED DESCRIPTION OF THE INVENTION

A cow-milking carousel 1 has an entrance 2, an exit 3, and several milking stations 4. Carousel 1 is also provided with three checkpoints 5, 6, and 7 connected to devices 8. In the vicinity of entrance 2 is an animal-identity confirmation device 9 and in the vicinity of exit 3 an animal-monitoring device 10.

How the carousel is controlled and operated will now be described.

EXAMPLE 1

A maximal speed of rotation is established with animal-identity confirmation device 9 out of action. Animals enter the carousel through entrance 2, and the operator immediately applies the teat cups. As the first animal approaches second checkpoint 6, the presence or absence of teat cups is determined. This can be done with a light barrier interrupted by the teat cups themselves or by appropriate baffles associated with the teat-cup removing mechanism. If a teat cup has not been removed yet, the speed is incrementally decreased in steps until the absence of teat cups is detected at one of the following milking stands. Once a signal is received from first checkpoint 5 confirming that the teat cups have been removed, the speed is increased again in steps until animals with teat cups in position are detected at second checkpoint 6 as well. The speed is accordingly decreased again in steps. This procedure is repeated with constant alteration.

EXAMPLE 2

When third checkpoint 7 is also employed, the speed of rotation is varied until more milking stands 4 without teat cups pass third checkpoint 7 than second checkpoint 6.

To ensure even more precise control, additional checkpoints can be included, in which event the procedure will be similar with respect to each preceding checkpoint.

EXAMPLE 3

With animal-identity confirmation device 9 in action, each animal is detected at entrance 2 and the mean milking time entered in devices 8. Devices 8 calculate the mean total milking time from the stored data relating to all the animals on carousel 1 and hence the optimal speed of rotation. A position along the circumference of carousel 1 for removing the teat cups is simultaneously determined electronically. The actuating signal is in this event obtained from the teat-cup removing mechanism. This approach allows very precise adaptation of the speed to the animals' actual milking time.

If an animal dallies at exit 3, animal-monitoring device 10 will stop carousel 1.

We claim:

1. A system for controlling and operating a cow-milking carousel which is rotatable at different speeds and has an entrance, an exit and a plurality of milking stations wherein teat cups are applied to an animal and are automatically removed when the animal has been milked, the system comprising: at least two checkpoints along a direction of rotation for monitoring a position of the teat cups of milking stations passing thereby and for effecting an automatic adjustment of the speed of the carousel to maximize the number of teat cups which have not yet been removed at a first of the at least two checkpoints, but have been removed at a second of the at least two checkpoints.

2. The system according to claim 1, comprising three checkpoints including a third checkpoint downstream of the second checkpoint in the direction of rotation and wherein the three checkpoints effect automatic adjustment of the speed of the carousel such that the teat cups have not been removed at the first checkpoint and more teat cups are removed at the third checkpoint than at the second checkpoint.

3. The system according to claim 1, wherein the checkpoints comprise pulse generators activated by the teat cups.

4. The system according to claim 1, wherein the checkpoints are connected to pulse generators for initiating automatic removal of the teat cups.

5. The system according to claim 1, further comprising an animal identity confirmation device at the entrance of the carousel for storing a milking time for each animal.

6. The system according to claim 5, further comprising a device for varying the speed of the carousel according to the stored milking times such that the teat cups are removed at the second checkpoint.

7. A method for controlling and operating a cow-milking carousel which is rotatable at different speeds and has an entrance, an exit and a plurality of milking stations wherein teat cups are applied to an animal and are automatically removed when the animal has been milked, the method comprising: monitoring a position of the teat cups of milking stations passing by at least two checkpoints along a direction of rotation and automatically adjusting the speed of the carousel to maximize the number of teat cups which have not yet been removed at a first of the at least two checkpoints, but have been removed at a second of the at least two checkpoints.

8. The method according to claim 7, comprising three checkpoints including a third checkpoint downstream of the second checkpoint in the direction of rotation and wherein the speed is automatically adjusted such that the teat cups have not been removed at the first checkpoint and more teat cups are removed at the third checkpoint than at the second checkpoint.

9. The method according to claim 7, wherein the checkpoints comprise pulse generators activated by the teat cups.

10. The method according to claim 7, wherein the checkpoints are connected to pulse generators which initiate automatic removal of the teat cups.

11. The method according to claim 7, further comprising providing an animal identity confirmation device at the entrance of the carousel for storing a milking time for each animal.

12. The method according to claim 11, further comprising varying the speed of the carousel according to the stored milking times such that the teat cups are removed at the second checkpoint.

* * * * *